US 6,625,159 B1

(12) United States Patent
Singh et al.

(10) Patent No.: US 6,625,159 B1
(45) Date of Patent: Sep. 23, 2003

(54) NONBLOCKING AND FAIR QUEUING SWITCHING METHOD AND SHARED MEMORY PACKET SWITCH

(75) Inventors: Bharat K. Singh, Roseville, CA (US); Bruce W. Melvin, Roseville, CA (US); Patricia A. Thaler, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/201,510

(22) Filed: Nov. 30, 1998

(51) Int. Cl.⁷ .............................................. H04L 12/56
(52) U.S. Cl. ..................................... 370/413; 370/235
(58) Field of Search .................................. 370/389, 392, 370/415, 315, 443, 229, 230.1, 419, 235

(56) References Cited

U.S. PATENT DOCUMENTS

| | | | | |
|---|---|---|---|---|
| 5,574,885 A | * | 11/1996 | Denzel et al. | 395/492 |
| 5,796,715 A | * | 8/1998 | Patterson et al. | 370/60 |
| 5,805,589 A | * | 9/1998 | Hochschild et al. | 370/389 |
| 6,097,705 A | * | 8/2000 | Ben-Michael et al. | 370/315 |
| 6,160,814 A | * | 12/2000 | Ren et al. | 370/427 |
| 6,295,295 B1 | * | 9/2001 | Wicklund | 370/392 |
| 6,359,861 B1 | * | 3/2002 | Sui et al. | 370/230 |
| 2001/0007562 A1 | * | 7/2001 | Matsuoka et al. | 370/415 |

* cited by examiner

*Primary Examiner*—Hassan Kizou
*Assistant Examiner*—Ahmed Elakam (57) ABSTRACT

The present invention provides an improved shared memory switching method in which a guaranteed minimum number of buffers per output port is reserved for each input port. The shared memory may also be optionally divided into reserved and unreserved buffers, with the guaranteed minimum number of buffers being provided from the reserved buffers. The unreserved buffers are available to any port and will handle burst communications and other events that cause a given input port's allocation of reserved buffers to be exhausted. So that bursts are also handled fairly among input ports, additional optional features of the present invention include limiting the number of unreserved buffers that may be consumed by a single input port. For fairness among output ports, method also preferably fairly allocates unreserved buffers among the output ports.

20 Claims, 3 Drawing Sheets

NONBLOCKING AND FAIR QUEUING SWITCHING METHOD AND SHARED MEMORY PACKET SWITCH

FIELD OF THE INVENTION

The present invention relates to all cell or frame based shared memory switches that control routing of discrete packets between an input port and an output port.

BACKGROUND OF THE INVENTION

Two basic forms of communications are circuit switched and packet switched communications. Circuit switched communications open a dedicated path of communication between a source and a destination. This forecloses access to the path by other sources and/or destinations even if only a small portion of the bandwidth of the path is being utilized. In the packet switched method, data is broken into packets when transmitted from a source and reassembled at the destination. This allows multiple sources and destinations to divide up and utilize the bandwidth of any given path, but presents a more complex problem because conflicting communications will contend for limited communication path resources.

Such switches require an amount of memory because packets will often have to wait a number of cycles before being transferred due to contention. Multi-port switches are generally classified by the manner in which their memory is allocated, as either input buffered, output buffered or shared memory architectures.

Input buffered switches are those in which packets are stored in an input queue. The recognized problem of these switches is termed head-of-line-blocking (HOL), where a packet at the head of the queue prevents others from being transmitted until the destination port transmits that packet. An algorithm is applied to the packet at the head of the queue to determine its destination. This packet remains at the head of the queue until the destination port processes or transmits the packet. Additional received packets are blocked by the packet at the head of the line. As an example, consider a system having one input port A and two output ports B and C. A situation may occur where output port B has become congested and packets arriving from input port A can not be transmitted to output port B as fast as they are arriving. Packets buffered for output port C will be transmitted. After a time, the buffers will be filled with packets destined for output port B which can not be transmitted. At this point, all packets arriving from input port A for output B and for output port C will be discarded. Even though output capacity for output port C is available, congestion at output port B will cause output port C's packets to be dropped. This head of line blocking is an undesirable effect because congestion on one network path interferes with traffic on other uncongested paths.

Output buffered switches solve these input buffered switch blocking problems by queuing packets at the output ports. This prevents one stream of traffic from a given input port from blocking other streams of traffic destined for a different output port. These switches suffer from a fairness problem though, because there is the potential that where traffic is inbound on two ports and destined for a single output port, one stream will completely consume all available buffers associated with the single port, leaving no buffers for the second stream. The problem is acute in environments with large bursts of traffic. Outbound packets are dissociated from their input port, any input port can therefore consume all the available buffers, leaving very few or no buffers for other input ports.

Shared memory switch architectures alleviate some of problems of both input buffered and output buffered switches, but potentially suffer the same problems of each to a lesser degree. In a shared memory switch, there is a pool of available buffers. These buffers may be allocated as either input or output buffers as needed. Once a buffer is released, it is returned to the pool of available buffers for use again as either an input or output buffer. There is a reduced potential for head-of-line-blocking and unfairness in allocation of the buffers, but each is still possible.

Accordingly, there is need for a shared memory switching method which solves head-of-line-blocking problems and provides improved fairness in allocation of output buffers among input ports. It is an object of the invention to provide such an improved shared memory switching method and switch.

SUMMARY OF THE INVENTION

The present invention provides an improved shared memory switching method and switch in which a guaranteed minimum number of buffers per output port is reserved for each input port. This precludes one input port from blocking the packet traffic of another input port at any of the output ports of the switch. The invention also provides a burst handling capability through optional preferred features in which the shared memory of the switch is divided into reserved and unreserved buffers, with the guaranteed minimum number of buffers being provided from the reserved buffers. The unreserved buffers are available to any port and will handle burst communications that exceed a given input port's allocation of reserved buffers. So that bursts are also handled fairly among input ports, additional optional preferred features of the present invention involve limiting the number of unreserved buffers that may be consumed by a single input port. For fairness among output ports, method also preferably fairly allocates unreserved buffers among the output ports.

BRIEF DESCRIPTION OF THE DRAWINGS

Other features, objects and advantages of the present invention will be apparent to those skilled in the art through reference to the attached drawings, of which.

DETAILED DESCRIPTION OF THE INVENTION

Broadly stated, the present invention concerns a shared memory packet switching method and switch which allocates the shared memory among input ports of the switch for output ports of the switch to prevent blocking by any particular input port of the switch. No single input port can exhaust reserved buffers from the shared memory and block access by another input port to any given output port. Burst conditions are handled by additional optional features of the invention, which permit use of unreserved buffers for burst conditions. Fairness may be provided in burst conditions through limiting the number of unreserved buffers that can be simultaneously used by a single output port for packets from a single input port. Limiting parameters and counters are preferred methods for tracking buffer quantities to achieve each of the various buffer allocation features provided by the invention.

For simplicity of illustration, the following description assumes a buffer size that is equal to one packet, reflecting the case of implementations where the buffer size is as large as the largest packet. Accordingly, each packet is stored in one buffer. Artisans will appreciate, however, that the invention is not limited to that case and is equally applicable to other implementations where a smaller buffer is used. For example, a buffer size of 256 bytes might be used and the largest packet size might be 1522 bytes. In that case, each packet would be stored in 1 to 6 buffers depending on its size. In the latter case, counters described herein would simply be incremented or decremented by the number of buffers in which the packet is stored rather than by one as in the illustrated embodiment.

Figure 1:
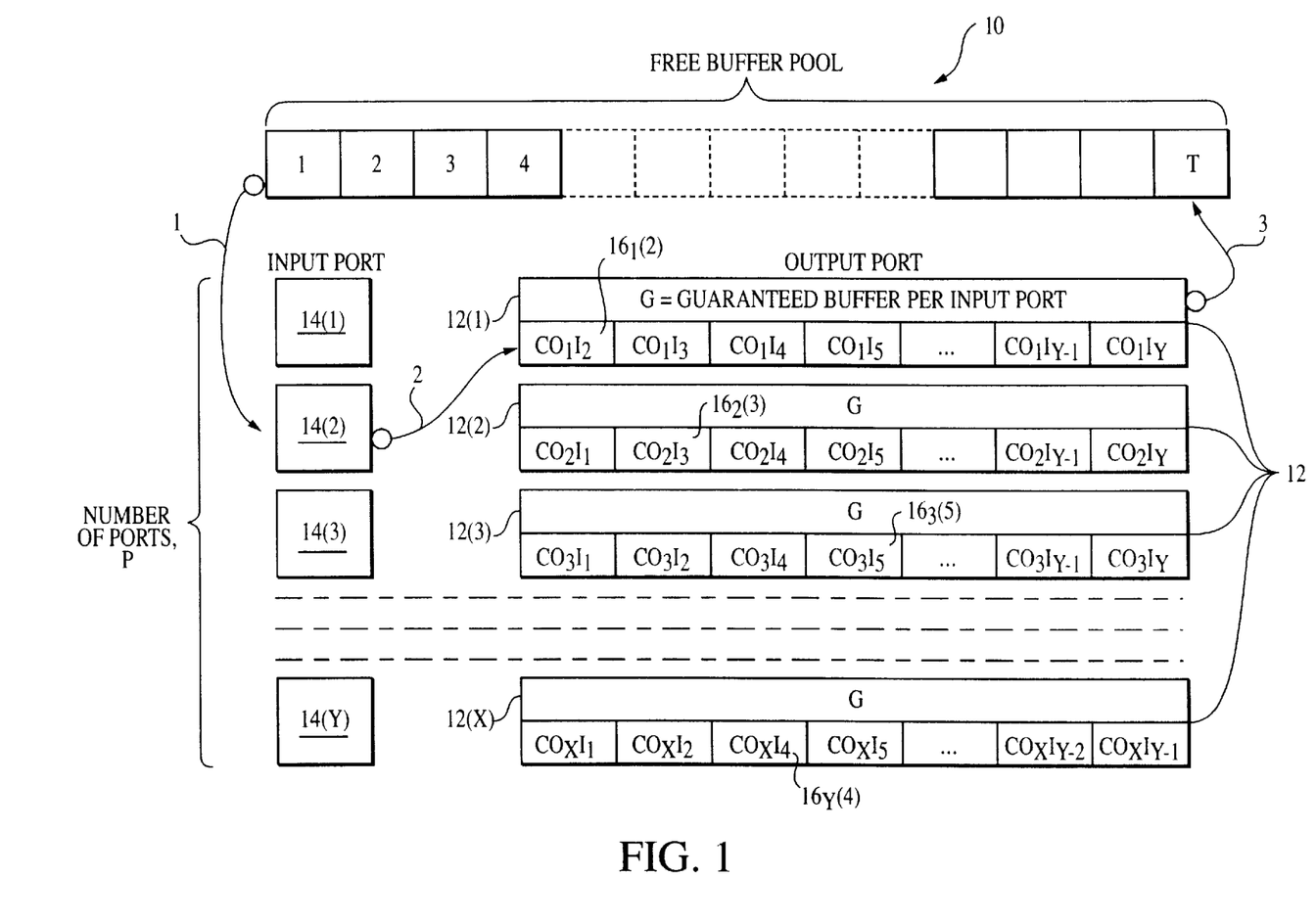
FIG. 1 is a logical diagram of a shared memory switch of the present invention.

Referring now to FIG. 1, shown is a logical representation of a switch constructed and managed in accordance with the invention to divide a shared free pool of buffers 10 among a plurality of X output ports 12 to allow shared and non-blocking access by a plurality of Y input ports 14. When a packet arrives at the switch, an input port 14 grabs an available buffer, e.g., buffer 1 of T total free buffers in the buffer pool 10. Once a switching decision is made in conventional fashion for the given packet which has been buffered, for example, at an input port 14(2), the given packet is added to the transmit queue of the appropriate destination output port designated by the given packet by transferring the buffer holding the packet to the output port, which in the example of FIG. 1 is the first output port 12(1). Additional buffers are then grabbed as needed by the input port 14(2) for receiving an additional packet. A single packet may use one or more buffers depending upon the particular switching implementation. Once the given packet is transmitted from the output port 12(1), the buffer (or buffers) which held it is released back into the free buffer pool, completing the general cycle of passing a packet through the switch.

In accordance with the invention, the available resources of the free buffer pool are allocated among output port 12(1)–12(X) and input port 14(1)–14(Y) pairs to avoid the case where a single port can monopolize available buffers causing blocking conditions at other ports. The pool 10 is divided into a reserved number of buffers, designated as Total Free Buffers (T). The following steps will allocate the T available buffers among ports of the switch.

Let there be $P_O$ number of output ports on the switch and $P_I$ number of input ports. A parameter G, which can be set globally or individually for each output port, indicates the number of buffers that are reserved or dedicated for each input port to a given output port. A preferred embodiment equally divides the T reserved buffers among ports of the switch. In that case, the parameter G is set to $T/(P_O*(P_I-1))$. $P_I-1$ accounts for the fact that a packet received on an input port is not forwarded on the same port and hence is not buffered to that port. Thus, each output port will have G buffers reserved for each input port.

For the buffer management, there are a plurality of individual counters 16 on each output port counting buffers that are used by each input port for each output port. Each counter has the label, $CO_XI_Y$, where X is the output port number and Y is the input port number which received the packet. Accordingly, $CO_1I_2$ is the counter at output port 12(1) that counts the number of packets queued from input port 14(2). At power up/reset, all $CO_XI_Y$ counters are set to zero. An input port of the switch retrieves a buffer from the free buffer pool. The input port uses this free buffer to receive a given packet, as represented by arrow 1 of FIG. 1.

The packet forwarding decision is made on the received packet. There are two possible forwarding decisions. In the case of a unicast, the packet is forwarded to a unique output port. In the case of broadcast or multicast, the packet is forwarded to a group of output ports.

In a unicast, the packet is added to the transmit queue of an output port if the output port counter $CO_XI_Y$ is less than G (indicating that the output port has reserved buffers for this input port), as indicated by arrow 2 of FIG. 1. After a packet is queued to the output port, the corresponding counter $CO_XI_Y$ is incremented. The packet is discarded if the output counter $CO_XI_Y$ has reached G. Hence, discard if ($CO_XI_Y$=G). Once the packet has been transmitted, the $CO_XI_Y$ counter is decremented and the buffer is released to the free buffer pool, as indicated by arrow 3 in FIG. 1.

A multicast occurs when the given packet is intended for multiple destinations. In such case, a packet may be added to several output ports which satisfy the same conditions as a unicast packet on any output port. If the conditions are not met on an output port, the packet is not queued to that port, but is queued to any other output port having available buffer capacity reserved to it for the input port receiving the packet. If the packet is queued, the corresponding counter $CO_XI_Y$ is incremented. When an output port transmits the packet, it decrements the counter $CO_{XY}$. When the last port has transmitted the packet, the buffer is released to the free pool of buffers.

This allocation of reserved buffers ensures that each port gets its fair share of the free buffers. It gives absolute fairness to all ports. However, burst events may result in packet loss since a port is only allocated its reserved buffers. The invention therefore optionally provides additional preferred features to accommodate burst events, which will be useful in implementations where such events are likely. This is accomplished by having a quantity of unreserved buffers in the pool of buffers. The available buffers in the pool 10 are divided into reserved and unreserved buffers. The reserved buffers provide guaranteed availability, in the manner described above. The remaining number of buffers are unreserved and can be used by any input port to absorb the bursts.

The burst capability of the invention preferably uses an additional counter $C_u$ to track unreserved buffers. Since G represents the guaranteed buffers available at a given output port for each input port, the system must reserve this number of buffers from the pool 10. Therefore, in a system with $P_I$ input ports the guaranteed buffers to be reserved, at one output, for all input ports is GBR=$(P_I-1)*G$, where $P_I-1$ accounts for the fact that a packet received on an input port is not forwarded on the same port and hence is not buffered to that port.

If the same amount is to be guaranteed for each output port, then the required total number of guaranteed buffers needed to be reserved from the pool 10 is N=$[(P_I1)*G]*P_O$. If different numbers of buffers are allocated at each output port, then N will be a summation of the buffers reserved separately at the output ports. Input ports will require $P_I$ number of buffers to receive next incoming packets. Therefore, free available unreserved buffers is defined as F=T-N-$P_I$. The value of F and G are inter-related and are implementation dependent.

Management of the reserved buffers is as described above, with the $CO_XI_Y$ counters ensuring that reserved buffers are fairly allocated at each output port for each input port. For the management of unreserved buffers, the additional unreserved buffer counter $C_u$ keeps the total count of available unreserved buffers. At power up/reset, $CO_XI_Y$ counters are set to zero and counter $C_u$ is set to F. An input port of the device retrieves a buffer from the free buffer pool and it uses this free buffer to receive a packet.

In the unicast case, if the output port counter $CO_XI_Y$ is less than G (indicating that the input port has a reserved buffer for this output port) the packet is added to the transmit queue of the output port and counter $CO_XI_Y$ is incremented. Where $CO_XI_Y$ equals G, such as during a burst event or a backup at an output queue, available unreserved buffers may be used. This is the case if the value of $C_u$ is greater than or equal to I (indicating that at least one unreserved buffer is available). Where an unreserved buffer is used, the packet is added to the transmit queue of the output port, $C_u$ is decremented and the packet buffer is marked as allocated to unreserved (this marking will become important when the packet is transmitted). If $C_u$ is zero, no unreserved buffers are available and the packet is dropped. Hence, the packet is enqueued if either $CO_{XY}<G$ or $C_u>=1$.

Once the packet has been transmitted, it must be determined whether the packet occupied a reserved or unreserved buffer. If the packet occupied an unreserved buffer (based on marking), $C_u$ should be incremented. Hence, after transmission, the buffer is released to free buffer pool and $CO_XI_Y$ is decremented if buffer was marked reserved. Otherwise, $C_u$ is incremented if the buffer is marked unreserved.

Where unreserved and reserved buffers are used, the preferred method of conducting a multicast uses available unreserved buffers for the multicast to avoid complications in releasing reserved buffers used in a multicast. In such a multicast, if $C_u>=1$ the packet is marked as using unreserved buffer and then added to each output queue specified in the multicast and the counter $C_u$ is decremented. If no unreserved buffer is available, i.e., $C_u=0$, then the packet is dropped. The same buffer is queued to each output port queue specified in the multicast decision and $C_u$ is decremented once since one buffer is used. When the last output port specified in the multicast has transmitted the packet, the buffer is released to the free buffer pool and counter "$C_u$" is incremented.

In both methods above, i.e., the use of reserved buffers where only reserved buffers are available and the use of unreserved buffers where both reserved and unreserved buffers are available, some inefficiency is caused by the need to handle multicast packets. In one case, a multicast packet consumes only one buffer, but buffer space is reserved for it by each packet for which it is queued. In the other case, there will be times when $CO_XI_Y$ has dropped below G but buffers for that output port are still used from $C_u$. In many cases, this is an acceptable trade-off for the simplification of the method it allows. In many cases, the inefficiency caused by the first is small because multicast packets are often a very small percentage of traffic. In the second case, since bursts are transient conditions, the buffers in $C_u$ will soon be released having accomplished their purpose of accommodating the burst.

However, there is an alternative which can be used where greater efficiency is desirable. This alternative is to treat multicast traffic as a separate output port for buffer utilization considerations. In this case, guaranteed buffers are allocated for multicast packets with a plurality of counters $CO_{MY}$ with one counter for each input port. $M=G*P_I$ buffers are reserved for multicast packets. Buffers for output ports and unreserved buffers are allocated as above. The unreserved buffers will be $F=T-N-M-P_I$.

At power up/reset, $CO_XI_Y$ counters and counters $CO_{MY}$ are set to zero and counter $C_u$ is set to F. An input port of the device retrieves a buffer from the free buffer pool and it uses this free buffer to receive a packet, In the unicast case, if the output port counter $CO_XI_Y$ is less than G (indicating that the input port has a reserved buffer for this output port) the packet is added to the transmit queue of the output port and counter $CO_XI_Y$ is incremented. Where $CO_XI_Y$ is greater than or equal to G, such as during a burst event or a backup at an output queue, available unreserved buffers may be used. This is the case if the value of $C_u$ is greater than or equal to 1 (indicating that at least one unreserved buffer is available), and then the packet is added to the transmit queue of the output port, $C_u$ is decremented and $CO_XI_Y$ is incremented. In this method, there is no need to mark the buffer as coming from the unreserved pool. If $C_u$ is zero, no unreserved buffers are available and the packet is dropped. Hence, the packet is enqueued if either $CO_{MY}<G$ or $C_u>=1$.

Once a unicast packet has been transmitted, it must be determined whether the output-input port pair was using any unreserved buffers. If $CO_XI_Y$ is greater than G, it was and $C_u$ is incremented. In either case, $CO_XI_Y$ is decremented. With this method, an unreserved buffer will be released as soon as any packet is transmitted from an output-input port pair that had used more than its reserved allocation rather than on transmission of the specific packet that on reception caused the allocation to be exceeded. Availability of unreserved buffers is maximized.

When a multicast packet is received, the behavior is the same except that the counter $CO_MI_Y$ is used in place of $CO_XI_Y$. When the last output port specified in the multicast has transmitted the packet, the buffer is released to the free buffer pool and counter $CO_MI_Y$ is decremented. If $CO_MI_Y$ is greater than G, $C_u$ is incremented. In !this method, no $CO_XI_Y$ counter is ever incremented or decremented for a :Multicast packet. The following optional features may also alternately use this $CO_MI_Y$ to achieve multicast as alternatives to the specific described uses of unreserved buffers.

It is possible that a burst, a slow communication channel, or other event may cause a single input port to dominate use of the unreserved buffers. Additional optional preferred features build upon the unreserved buffer concept and introduce a new parameter; MAI, and a new counter $CI_y$, to achieve fairness during such events and avoid such domination. These features are logically represented in FIG. 2, where each input port 14 has a $CI_Y$ counter and an associated MAI parameter. The maximum available buffers per input port, MAI, determines the maximum number of buffers that an input port is allowed to use from the unreserved buffers at any one time. The MAI can be set between 0 and F. The term F represents the case where all the free available buffers may be allocated to a single port allowing that port to dominate use of the unreserved buffers. The MAI can be globally set or it can be unique for each input port and is implementation dependent. The following implementation assumes a globally set MAI for illustrative purposes, but unique $MAI_Y$, where $Y=$ a corresponding input port may easily be implemented in similar fashion.

Figure 2:
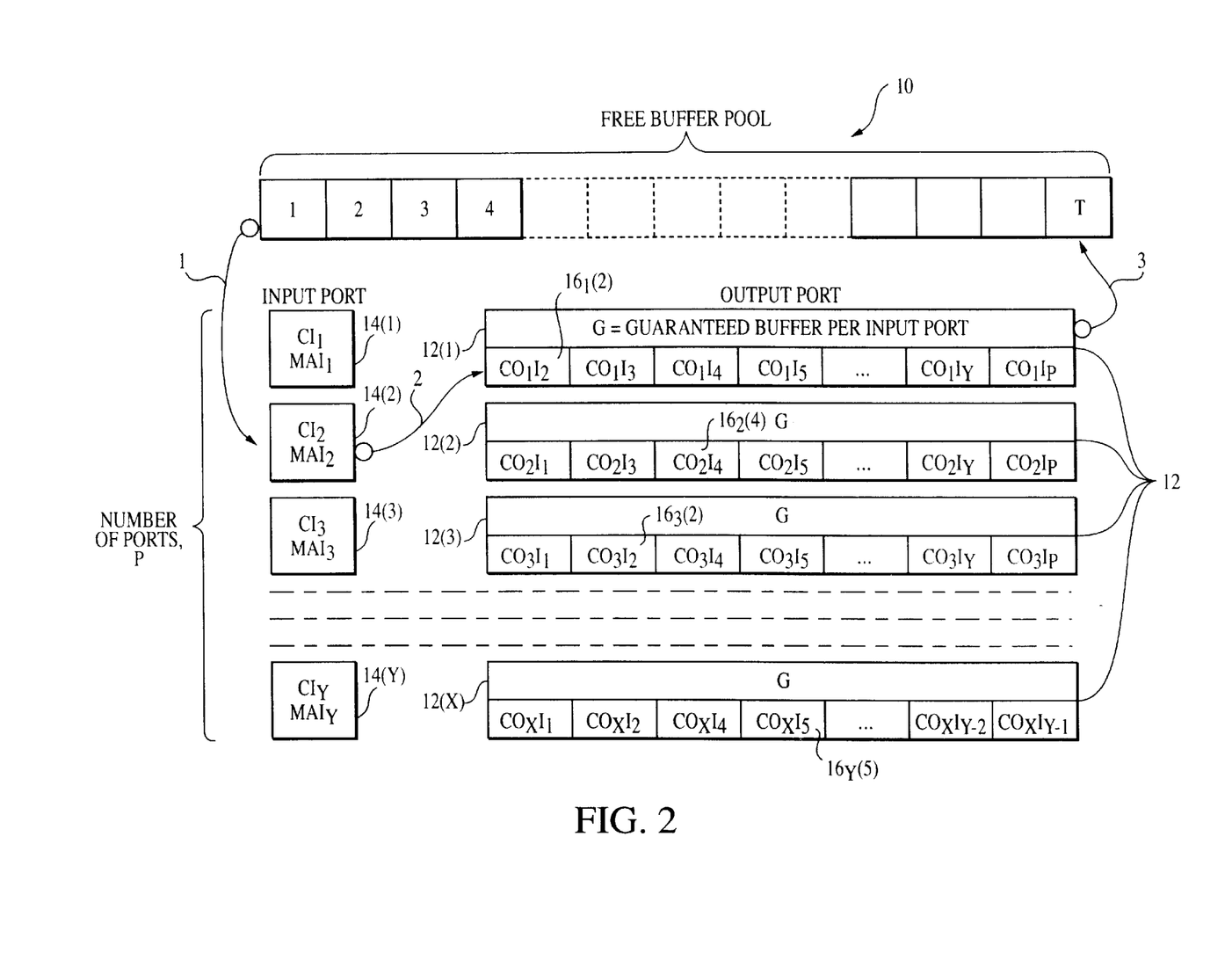
FIG. 2 is a logical diagram illustrating burst handling features of the switch of the present invention.

The $CI_Y$ counter is also set to zero at reset or power up. Thus, at power up/reset, $CO_XI_Y$ counters are set to zero, $CI_Y$ is set to zero, $C_u$ is set to F.

In the unicast case, if $CO_xI_y<G$ a packet received at an input port is added to the output queue determined by a forwarding decision based on the packet and the corresponding $CO_X I_Y$ counter is incremented (arrow 2 of FIG. 2). Where a burst or other event results in $CO_X I_Y$ being equal to G, the packet may still be added to the appropriate output queue only if $CI_Y$<MAI and $C_u$>= 1. In the latter case, $CI_Y$ of the input port is incremented, the packet is marked as occupying unreserved buffer, and $C_u$ is decremented. If either $CI_Y$=MAI or $C_u$<1, the packet is dropped. Where $CI_Y$=MAI, the packet is dropped even though some unreserved buffers might be available. This preserves fairness in the allocation of the unreserved buffers.

When the output port transmits the packet, it decrements the associated $CO_X I_Y$ if the buffer holding the packet was reserved and releases the buffer to the free buffer pool (arrow 3 of FIG. 2). If the packet had been marked as unreserved then counter $C_u$ is incremented and $CI_Y$ is decremented.

In the multicast case, if for an output port $CI_Y$<MAI and $C_u$>=1 or the packet has been marked as unreserved buffer (indicating that a buffer has already been allocated for the multicast) then the packet is added to the output queue specifed in the multicast decision. If the packet is unmarked, then the packet is marked as occupying an unreserved buffer, the counter $C_u$ is decremented and $CI_Y$ of the input port which queued the given packet is incremented. Otherwise, the packet is dropped. When the last port has transmitted the packet, the buffer is released to the free buffer pool 10, counter $C_u$ is incremented and $CI_Y$ is decremented.

Additional optional preferred features embody fair allocation of unreserved buffers, for a given input port, among output ports. This is represented logically in FIG. 3. To achieve fairness in allocating unreserved buffers among output ports, an additional parameter M is used to restrict each output port's use of unreserved buffers. Like MAI, M may be unique to individual output ports or may be globally set to be equal for each output port. In the latter case, $M_1=M_2=M_3=M_p$ in FIG. 3, and the globally set value is simply referred to as M.

Figure 3:
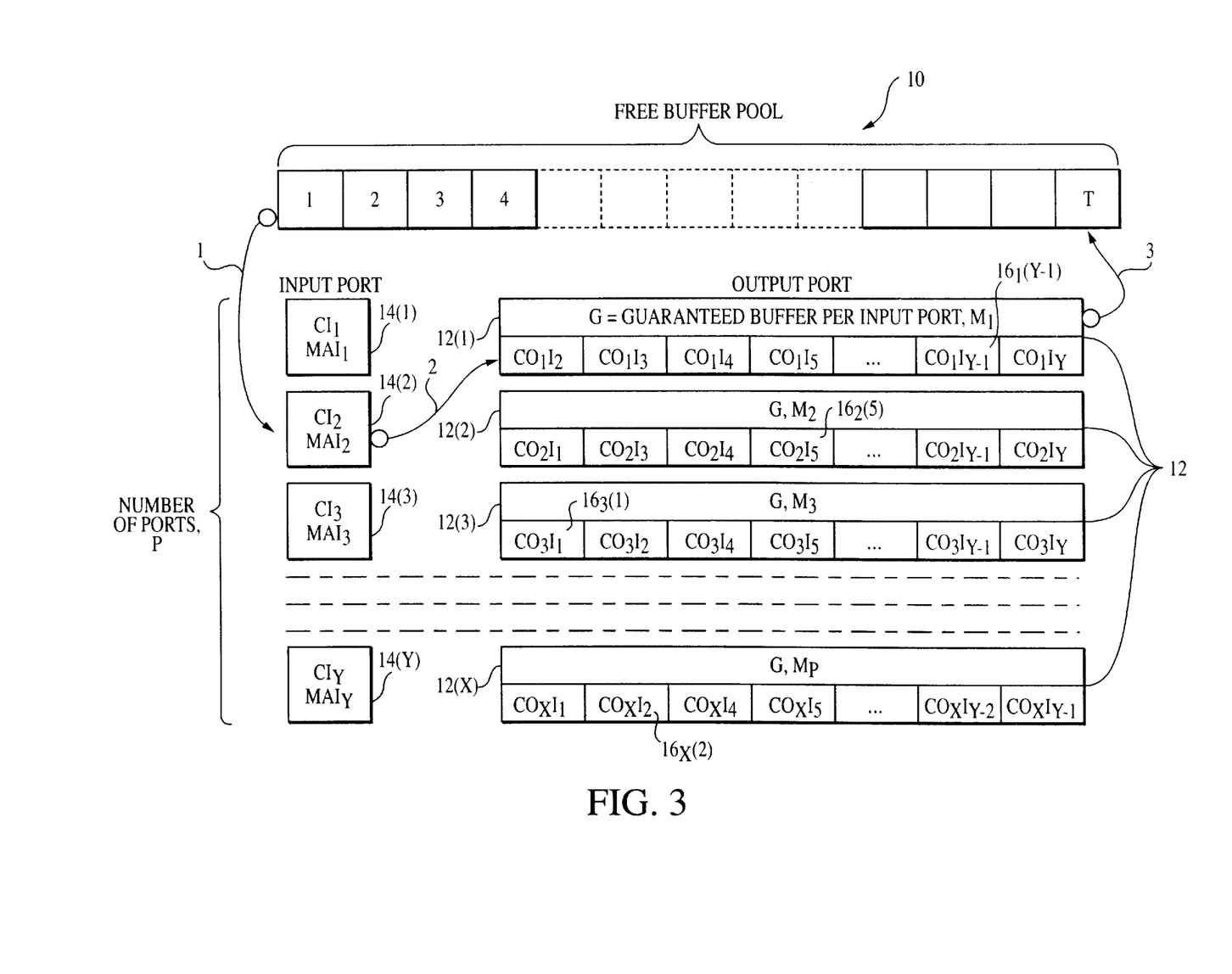
FIG. 3 is a logical diagram illustrating additional burst handling features of the present invention.

In addition to the previously discussed counters, there are individual counters $UO_X I_Y$ on each output port counting unreserved buffers that are used by each input port for each output port. Each counter has the label $UO_X I_Y$ where x is the output port number and y is the input port number which received the packet. At power up/reset, the $CO_X I_Y$, $UO_X I_Y$, and $CI_Y$ counters are set to zero and counter $C_u$ is set to F.

After input queuing of a given packet and a forwarding decision based on a destination specified by the given packet, either a unicast or multicast is implemented. In the case of a unicast, if $CO_X I_Y$<G the packet is added to the output queue designated through the forwarding decision and its $CO_X I_Y$ counter is incremented. Where $CI_Y$<G, the packet is still queued using an unreserved buffer only if $CI_Y$<MAI and $C_u$>=1 and $UO_X I_Y$<M. In the latter case, three associated operations are conducted: increment $UO_X I_Y$; increment $CI_Y$ of the input port, mark packet as occupying unreserved buffer, and decrement counter $C_u$. As a result, the packet may be dropped even though unreserved buffers are available if either the particular input or output port has exhausted its allotment of unreserved buffers. If any of the conditions for queuing the packet using the unreserved buffer are not met, the packet is dropped.

When the output port transmits the packet, it decrements the counter $CO_X I_Y$ if the buffer holding the packet was reserved, and releases the buffer to the free buffer pool. If the packet had been marked unreserved then counter $C_u$ is incremented, and $UO_X I_Y$ and $CI_Y$ are decremented.

In the multicast case, if $CI_Y$<MAI, $UO_X I_Y$<M, and $C_u$>=1 or the packet is marked as unreserved buffer, indicating an unreserved buffer has already been allocated when the packet was queued at another output queue, then the packet is added to an output queue specified in the multicast. If the packet is unmarked, then it is marked as occupying unreserved buffer, $UO_X I_Y$ is incremented, $C_u$ is decremented, and $CI_Y$ of the input port which queued the given packet is incremented. The test and resulting actions are repeated for each output port specified in the multicast. If the conditions are not met for any output port (that is, the packet is not queued to any output port), the packet is dropped. When the packet is transmitted on a port, $UO_X I_Y$ for that port is decremented. When the last port has transmitted the packet, the buffer is released to the free buffer pool 10, counter $C_u$ is incremented and $CI_Y$ is decremented.

This final optional feature provides fairness by accounting for uneven data rates, uneven traffic loads and collisions on shared media among the output ports. For each of these conditions, an output port will not capture all the buffers if the packets are being forwarded to one congested port.

In varying result, the invention therefore provides for the fair use of shared memory resources in an packet switch. Reserved buffers are allocated among ports to prevent a single port from dominating the memory causing a blocking condition. Unreserved buffers may also be provided in the shared memory pool to accommodate bursts of traffic and other events which can lead to an unfair buffer allocation. Additional levels of fairness are provided to accommodate burst and similar conditions when unreserved buffers are allocated among input ports and allocated among output ports. Individual allocating may be varied for any of the features of the invention thereby permitting tailoring of allocations to suit individual implementations based upon determined traffic conditions, and the parameters may change over time through software or firmware code with or without human intervention as monitored traffic conditions change.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A queuing management method for a shared memory packet switch having input ports and output ports, the method comprising the steps of:

dividing shared memory of the switch into a plurality of buffers;

allocating buffers from the plurality of buffers among ports of the switch so that each input port is, allocated at least one buffer for each output port of the switch; and queuing a packet from a given input port for output if a buffer allocated to the given input port and corresponding to an output port designated by the packet is free, else, discarding the packet, for each output port, setting a guaranteed available buffer parameter for each input port of the switch;

maintaining separate counters for each output port counting buffers used by each input port; the method further comprising a step of determining that a buffer is free for the given input port at an output Port designated by the packet when the counter for the given input port at the output port designated by the packet is less than the guaranteed available buffer parameter, wherein said step of dividing comprises dividing the shared memory into a plurality of reserved buffers and a plurality of unreserved buffers; and wherein said guaranteed available buffer parameter allocates reserved buffers;

said separate counters for each output port count reserved buffers; and said step of queuing queues the packet if either the counter for the given input port at the output port designated by the packet is less than the guaranteed available buffer parameter or an unreserved buffer is available.

2. A queuing management method for a shared memory packet switch having input ports and output ports, the method comprising the steps of:

dividing shared memory of the switch into a plurality of buffers;

allocating buffers from the plurality of buffers among ports of the switch so that each input port is allocated at least one buffer for each output port of the switch; and queuing a packet from a given input Port for output if a buffer allocated to the given input port and corresponding to an output port designated by the packet is free, else, discarding the packet, wherein:

said step of dividing comprises dividing the shared memory into a plurality of reserved buffers and unreserved buffers;

said step of allocating comprises allocating reserved buffers among ports of the switch; and said step of queuing queues the packet if either a reserved buffer allocated to the given input port and corresponding to the output port designated by the packet is free or an unreserved buffer is free.

3. The method according to claim 2, comprising a step of marking a buffer used to queue the packet as an unreserved or reserved buffer.

4. The method according to claim 2, wherein said step of allocating further comprises limiting the number of unreserved buffers which may be used by each input port of the switch and said step of queuing only queues the packet if either a reserved buffer allocated to the given input port and corresponding to the output port designated by the packet is free or an unreserved buffer is free and the input port has not reached its limit of unreserved buffers.

5. The method according to claim 4, wherein said step of allocating further comprises setting a maximum limit of unreserved buffers per output port that can be used by one input port and said step of queuing only queues the packet if either a reserved buffer allocated to the given input port and corresponding to the output port designated by the packet is free or an unreserved buffer is free, the limit of unreserved buffers per that input port has not been reached, and the maximum limit of unreserved buffers for the output port designated by the packet has not been exceeded.

6. A queuing management method for a shared memory packet switch having input ports and output ports, the method comprising the steps of:

dividing shared memory of the switch into a plurality of buffers;

allocating buffers from the plurality of buffers among ports of the switch so that each input port is allocated at least one buffer for each output port of the switch; and queuing a packet from a given input port for output if a buffer allocated to the given input port and corresponding to an output port designated by the packet is free, else, discarding the packet, the switch is divided into T number of buffers and said step of allocating comprises:

guaranteeing, for each output port, G number of buffers for each input port, where G is defined as $G=T/\{P_O*(P_I-1)\}$ $P_O$=number of output ports for the switch;

$P_I$=number of input ports for the switch; and $P_{I-1}$=is one less than PI.

7. The method according to claim 6, wherein counters $CO_X I_Y$ are maintained to track a number of queued packets, where Y=a switch input port number and X=a switch output port number, and a buffer allocated to the given input port is determined to be free in said step of queuing when $CO_X I_Y < G$ for Y=the given input port and X=the output port designated by the packet.

8. A queuing management method for a shared memory packet switch having input ports and output ports, the method comprising the steps of:

dividing shared memory of the switch into a plurality of buffers, allocating buffers from the plurality of buffers among ports of the switch so that each input port is allocated at least one buffer for each output port of the switch, and queuing a packet from a given input sort for output if a buffer allocated to the given input port and corresponding to an output port designated by the packet is free, else, discarding the packet, wherein shared memory of the switch is divided into N number of reserved packet buffers and F number of unreserved buffers from T number of total available buffers and said step of allocating comprises:

guaranteeing G number of buffers per input port where G is defined as $G=N/\{P_o*(P_{I-1})\}$;

$P_o$=number of output ports for the switch, $P_I$=number of input ports for the switch;

$P_{I-1}$=is one less than Pl; and said step of queuing queues the packet if either less than G packets are queued from the given input port for the output port designated by the packet or an unreserved buffer is available.

9. The method according to claim 8, further comprising a step of setting a maximum number of unreserved buffers that can be used at one time by a single input port and said step of queuing only queues the packet with an available unreserved buffer if the maximum number of unreserved buffers is not in use by the given input port.

10. The method according to claim 9, further comprising a step of setting a maximum number of unreserved buffer that can be used at one time for a single pairing of input port and output port and said step of queuing only queues the packet with an available unreserved buffer if the maximum number of unreserved buffers for a single pairing of input port and output port is not in use by the pair of input port and output port designated by the packet.

11. The method according to claim 8, wherein counters $CO_X I_Y$ are maintained to track a number of queued packets in reserved buffers, where Y=a switch input port number and X=a switch output port number, and a reserved buffer allocated to the given input port is determined to be fe in said step of queuing when $CO_X I_Y < G$ for Y=the given input port and X=the output port designated by the packet.

12. The method according to claim 11, wherein a counter $C_u$ is maintained to track a number of available unreserved buffers and an unreserved buffer is determined to be free in said step of queuing when $C_u >= 1$.

13. The method according to claim 12, wherein counters $CI_Y$ are maintained to track a number of unreserved buffers used by individual input ports and ar unreserved buffer is determined to be available in said step of queuing when $C_u >= 1$ and $CI_Y$ is less than a set maximum number of unreserved buffer that can be used at one time by a single input port.

14. The method according to claim 13, wherein counters $UO_X I_Y$ are maintained to track a number of unreserved buffers that can be used at one time for a single output port by a single input port and an unreserved buffer is determined to be available in said step of queuing when $C_u >= 1$, $CI_Y$ is less than a set maximum number of unreserved buffers that can be used at one time for a single output port, and $UO_X I_Y$ is less than a set maximum number of unreserved buffers that can be used for a single output port by a single input port for Y=the given input port and X= the output port designated by the packet arriving at the given input port.

15. A shared memory packet switch, comprising:

a plurality of input port which accept packet transmissions from a plurality of transmission sources, the packets including information concerning their destination;

a plurality of output ports which transmit packets received from said plurality of input ports to a plurality of destinations; and a pool of buffers for storing packets, said input ports and laid output ports both using buffers from said pool of buffers for packet storage, said pool of buffers being divided to reserve buffers so that each of said plurality of input ports has a predetermined corresponding number of buffers that can be queued at each of said plurality of output ports at one time and a buffer transfer from an input port to an output port is prevented when the output port is already using its corresponding predetermined number of buffers for the input port, wherein said pool of buffers further comprises a set of unreserved buffers accessible by any one of said plurality of input ports when one of said plurality of input ports has used up the number of buffers which has been reserved to it.

16. The switch according to claim 15, wherein the number of buffers from said set of unreserved buffers which may be used by each of said plurality of input ports is limited to less than the total number of said unreserved buffers.

17. The switch according to claim 16, wherein said set of unreserved buffers is further allocated in predetermined numbers among said plurality of output ports.

18. A shared memory packet switch, comprising:

a plurality of input ports which accept packet transmissions from a plurality of transmission sources, the packets including information concerning their destination;

a plurality of output ports which transmit packets received from said plurality of input ports to a plurality of destinations;

a pool of buffers for storing packets, said input ports and said output ports both using buffers from said pool of buffers for packet storage;

a plurality of counters equal to the number of the plurality of input ports for each of the plurality of output ports, said counters each counting the number of packets queued from a particular one of said plurality of input ports to a particular one of said plurality of output ports, and preventing queuing of additional packets once a predetermined counter value has been reached; and an unreserved buffer counter set to a predetermined unreserved number of said pool of buffets to permit use of one or more of said unreserved number of said pool of buffers by any one of said plurality of input ports which has met its predetermined counter value and has an additional packet to queue at a particular output port, wherein said predetermined counter value is equal for each of the plurality of counters.

19. The switch according to claim 18, further comprising a maximum input port parameter which limits the number of said unreserved number of said pool of buffers that can be used simultaneously by a single input port.

20. The switch according to claim 19, further comprising a plurality of maximum output port parameters equal to the number of the plurality of input ports for each of the plurality of output ports, said output port parameters limiting the number of unreserved buffers of said pool of buffers that can be in the output port from any single input port.

* * * * *

UNITED STATES PATENT AND TRADEMARK OFFICE
CERTIFICATE OF CORRECTION

PATENT NO. : 6,625,159 B1
DATED : September 23, 2003
INVENTOR(S) : Bharat K. Singh et al.

It is certified that error appears in the above-identified patent and that said Letters Patent is hereby corrected as shown below:

Column 8,
Line 54, after "is" delete the comma
Line 66, delete "Port" and insert therefor -- port --

Column 9,
Line 24, delete "Port" and insert therefor -- port --

Column 10,
Line 4, after "packet," insert -- wherein shared memory of --
Line 9, delete "($P_l$-1)}" and insert therefor -- ($P_{l-1}$)} --
Line 30, delete "sort" and insert therefor -- port --
Line 65, delete "fe" and insert therefor -- free --

Column 11,
Line 7, delete "ar" and insert therefor -- an --
Line 24, delete "port" and insert therefor -- ports --
Line 32, delete "laid" and insert therefor -- said --

Column 12,
Line 27, delete "buffets" and insert therefor -- buffers --

Signed and Sealed this

Twenty-second Day of March, 2005

JON W. DUDAS
*Director of the United States Patent and Trademark Office*